United States Patent [19]
Hill

[11] Patent Number: 6,137,206
[45] Date of Patent: Oct. 24, 2000

[54] MICROELECTROMECHANICAL ROTARY STRUCTURES

[75] Inventor: Edward A. Hill, Chapel Hill, N.C.

[73] Assignee: Cronos Integrated Microsystems, Inc., Morrisville, N.C.

[21] Appl. No.: 09/275,058

[22] Filed: Mar. 23, 1999

[51] Int. Cl.[7] .............................. H02N 10/00; F01B 29/10
[52] U.S. Cl. ........................ 310/306; 310/307; 318/117; 60/528
[58] Field of Search ................................. 310/306, 307, 310/309, 346, 40 MM; 318/117; 60/528, 523, 513; 322/2 A, 2 R; 136/200; 374/176; 376/317; 505/150, 166

[56] References Cited

U.S. PATENT DOCUMENTS

| | | | |
|---|---|---|---|
| 1,258,368 | 3/1918 | Smith | 310/306 |
| 1,658,669 | 2/1928 | Cohn et al. | 310/306 |
| 2,466,703 | 4/1949 | Harrison et al. | 318/24 |
| 3,213,318 | 10/1965 | Glenn | 315/94 |
| 3,280,550 | 10/1966 | Cassidy | 310/306 |
| 3,304,446 | 2/1967 | Martinek et al. | 310/8 |
| 3,609,593 | 9/1971 | Bell et al. | 331/156 |
| 4,806,815 | 2/1989 | Honna | 310/307 |
| 5,179,499 | 1/1993 | MacDonald et al. | 34/313 |
| 5,180,940 | 1/1993 | Paratte et al. | 310/40 MM |
| 5,184,269 | 2/1993 | Shimada et al. | 361/24 |
| 5,191,251 | 3/1993 | Paratte | 310/309 |
| 5,261,747 | 11/1993 | Deacutis et al. | 374/137 |
| 5,296,775 | 3/1994 | Cronin et al. | 310/309 |
| 5,309,056 | 5/1994 | Culp | 310/306 |
| 5,355,712 | 10/1994 | Peterson et al. | 73/4 R |
| 5,367,584 | 11/1994 | Ghezzo et al. | 385/17 |
| 5,441,343 | 8/1995 | Pylkki et al. | 374/137 |
| 5,467,068 | 11/1995 | Field et al. | 335/4 |
| 5,475,318 | 12/1995 | Marcus et al. | 324/762 |
| 5,483,799 | 1/1996 | Dalto | 62/3.7 |
| 5,536,988 | 7/1996 | Zhang et al. | 310/309 |
| 5,558,304 | 9/1996 | Adams | 244/134 A |

(List continued on next page.)

FOREIGN PATENT DOCUMENTS

| | | |
|---|---|---|
| 0 469 749 | 2/1992 | European Pat. Off. . |
| 0 478 956 | 4/1992 | European Pat. Off. . |
| 0 665 590 | 8/1995 | European Pat. Off. . |
| 764821 | 5/1934 | France . |
| 38 09 597 | 10/1989 | Germany . |
| 792145 | of 0000 | United Kingdom . |

OTHER PUBLICATIONS

Klaassen E H et al: "Silicon Fusion Bonding and Deep Reactive Ion Etching: A New Technology for Microstructures" *Sensors and Actuators A*, vol. 52, No. 1/03, Mar. 1996, pp. 132–139.

(List continued on next page.)

*Primary Examiner*—Nestor Ramirez
*Assistant Examiner*—Dang Dinh Le
*Attorney, Agent, or Firm*—Myers Bigel Sibley & Sajovec

[57] ABSTRACT

MEMS (Microelectromechanical System) structures are provided that are designed to rotate in response to thermal actuation or the like. In one embodiment, the MEMS rotary structure includes a hub having one or more radial spoke members that impose a rotational force upon the hub in response to applied changes in temperature. The MEMS rotary structure can also include a ring at least partially encircling the hub and connected to the hub by means of one or more hub spoke members. Controllable clockwise, counterclockwise, or both clockwise and counterclockwise rotation of the hub or ring are provided. The MEMS rotary structures can also include thermal arched beam actuators that are operably connected to the spoke member. As the temperature changes, the thermal arched beam actuators move the spoke members in order to rotate the MEMS structure. Various applications are provided for these rotating MEMS structures, including but not limited to rotary actuators, rotary switches and relays, variable capacitors, variable resistors, shutters, and valves.

35 Claims, 13 Drawing Sheets

U.S. PATENT DOCUMENTS

| | | | |
|---|---|---|---|
| 5,600,174 | 2/1997 | Reay et al. | 257/467 |
| 5,602,955 | 2/1997 | Haake | 385/136 |
| 5,606,635 | 2/1997 | Haake | 385/53 |
| 5,629,665 | 5/1997 | Kaufmann et al. | 338/18 |
| 5,644,177 | 7/1997 | Guckel et al. | 310/40 MM |
| 5,659,285 | 8/1997 | Takeda | 337/389 |
| 5,722,989 | 3/1998 | Fitch et al. | 606/205 |
| 5,796,152 | 8/1998 | Carr et al. | 257/415 |
| 5,813,441 | 9/1998 | Dewispelaere | 139/455 |
| 5,862,003 | 1/1999 | Saif et al. | 359/871 |
| 5,881,198 | 3/1999 | Haake | 385/136 |
| 5,903,078 | 5/1999 | Sakamoto et al. | 310/90.5 |
| 5,909,078 | 6/1999 | Wood et al. | 310/307 |

OTHER PUBLICATIONS

Phipps, Thesis: *Design And Development Of Microswitches For Micro–Electro–Mechanical Relay Matrices*, Air Force Inst. of Tech., Wright–Patterson AFB, OH School of Engineering, 1995.

Yamagata, et al., *A Micro Mobile Mechanism Using Thermal Expansion And Its Theoretical Analysis—A Comparison With Impact Drive Mechanism Using Piezoelectric Elements, Proceedings of the IEEE Micro Electro Mechanical Systems*, 1994, pp. 142–147.

Oh, et al., *Thin Film Heater On A Thermally Isolated Microstructure, Smart Materials Fabrication and Materials for Micro–Electro–Mechanical Systems*, 1992, pp. 277–282.

Safranek, *The Properties Of Electrodeposited Metals & Alloys, Amer. Electroplaters & Surface Finishers Society*, 1986, pp. 295–315.

Klassen, et al., *Silicon Fusion Bonding And Deep Reactive Ion Etching: A New Technology For Microstructures, Transducers '95—Eurosensors IX*, The 8th International Conference On Solid State Sensors And Actuators, and Eurosensors IX, Stockholm, Sweden, Jun. 25–29, 1995, pp. 556–559.

Noworolski, et al., *Fabrication Of SOI Wafers With Buried Cavities Using Silicon Fusion Bonding And Electrochemical Etchback, Transducers '95—Eurosensors IX*, The 8th International Conference On Solid State Sensors And Actuators, and Eurosensors IX, Stockholm, Sweden, Jun. 25–29, 1995, pp. 71–74.

*Single Crystal Silicon Actuators And Sensors Based On Silicon Fusion Bonding Technology, Semiannual Progress Report 1, Advanced Research Projects Agency, Lucas NovaSensor*, Contract No. DAAL 01–94–C–3411, Apr.–Jul. 1994.

*Single Crystal Silicon Actuators And Sensors Based On Silicon Fusion Bonding Technology, Semiannual Progress Report 2, Advanced Research Projects Agency, Lucas NovaSensor*, Contract No. DAAL 01–94–C–3411, Jul. 1994–Jan. 1995.

*Single Crystal Silicon Actuators And Sensors Based On Silicon Fusion Bonding Technology, Semiannual Progress Report, Advanced Research Projects Agency, Lucas NovaSensor*, Contract No. DAAL 01–94–C–3411, Jan.–Jul. 1995.

*Single Crystal Silicon Actuators And Sensors Based On Silicon Fusion Bonding Technology, Semiannual Progress Report, Advanced Research Projects Agency, Lucas NovaSensor*, Contract No. DAAL 01–94–C–3411, Jan.–Aug. 1996.

J.W. Judy et al., *Surface Micromachined Linear Thermal Microactuator, International Electron Devices Meeting 1990. Technical Digest (Cat. No. 90CH2865–4*, Dec. 1990, New York, New York, pp. 629–632.

Fedder et al., *Multimode Digital Control of a Suspended Polysilicon Microstructure, Journal of Microelectromechanical Systems*, Dec. 1986, vol. 5, No. 4, pp. 283–297.

Comtois et al., *Applications for Surface–Micromachined Polysilicon Thermal Actuators and Arrays, Sensors and Actuators*, Jan. 1997, vol. 58, No. 1, pp. 19–25.

Lin et al., *Vertically Driven Microactuators by Electrothermal Buckling Effects, Sensors and Actuators*, Nov. 1998, vol. 17, Nos. 1–2, pp. 35–39.

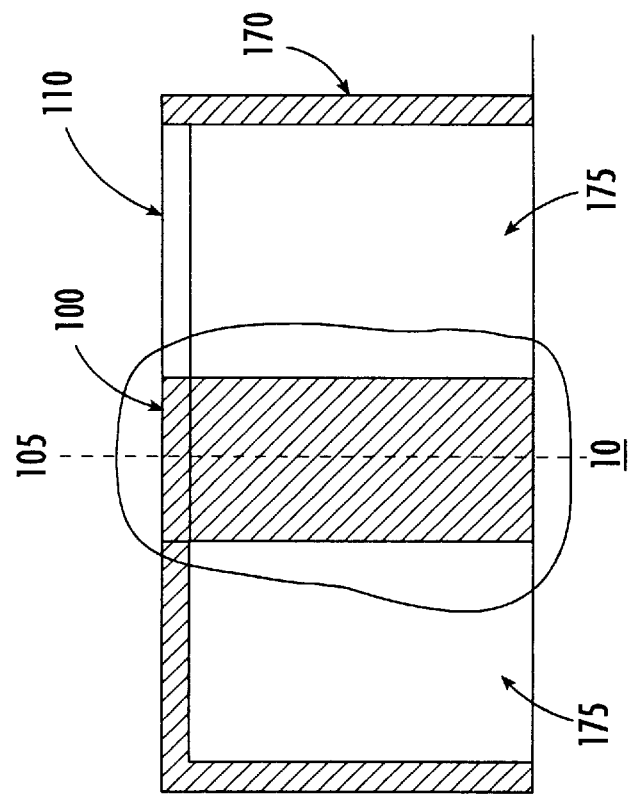
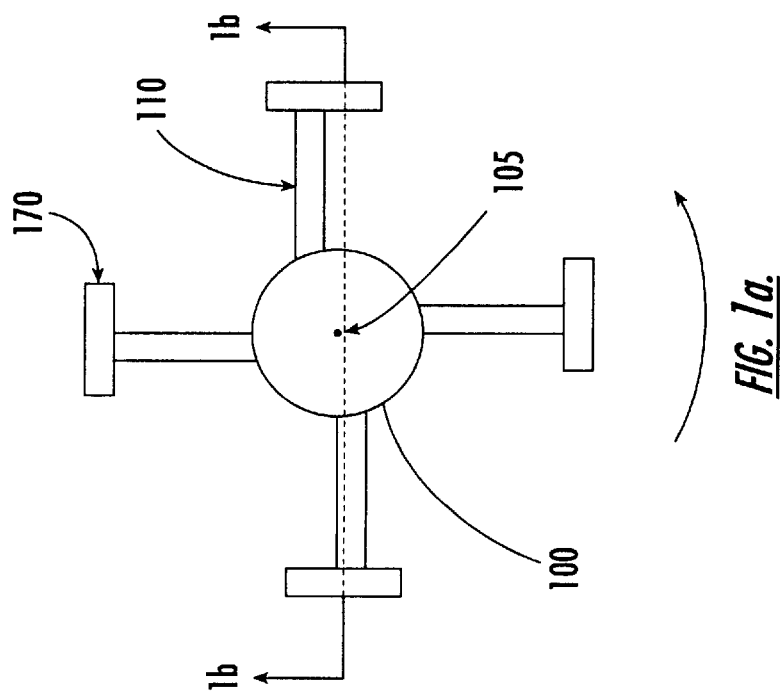

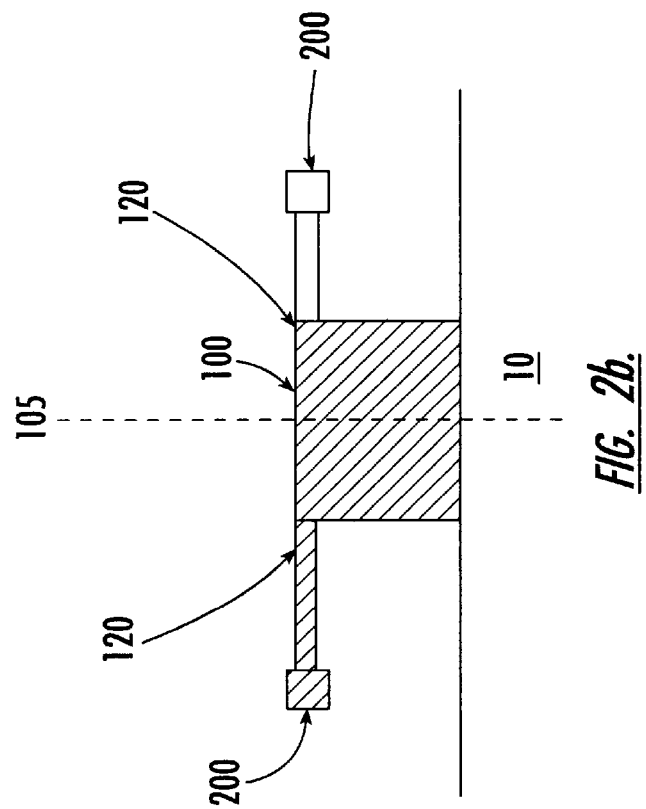
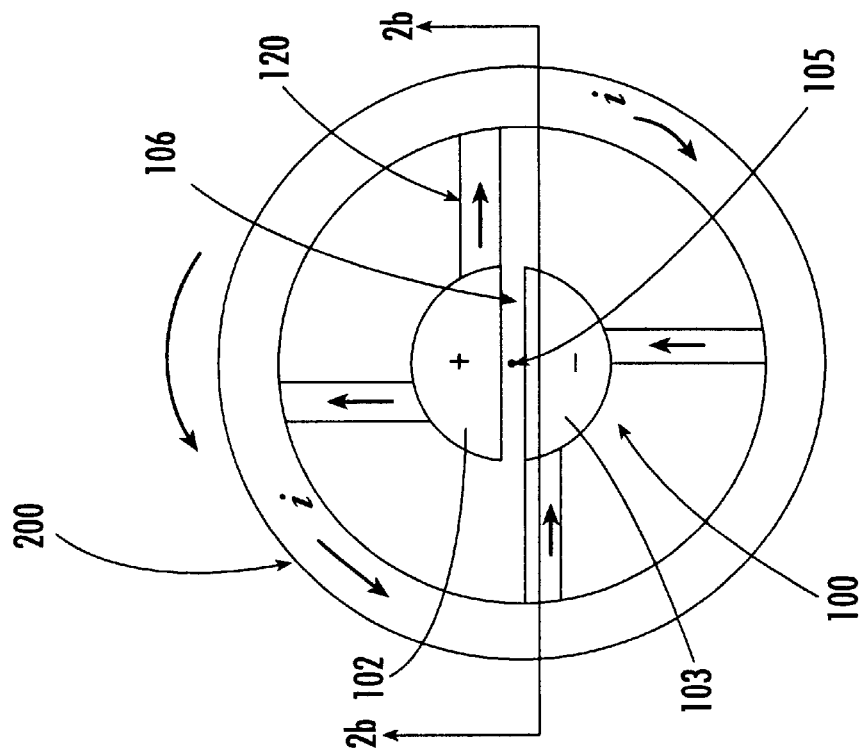

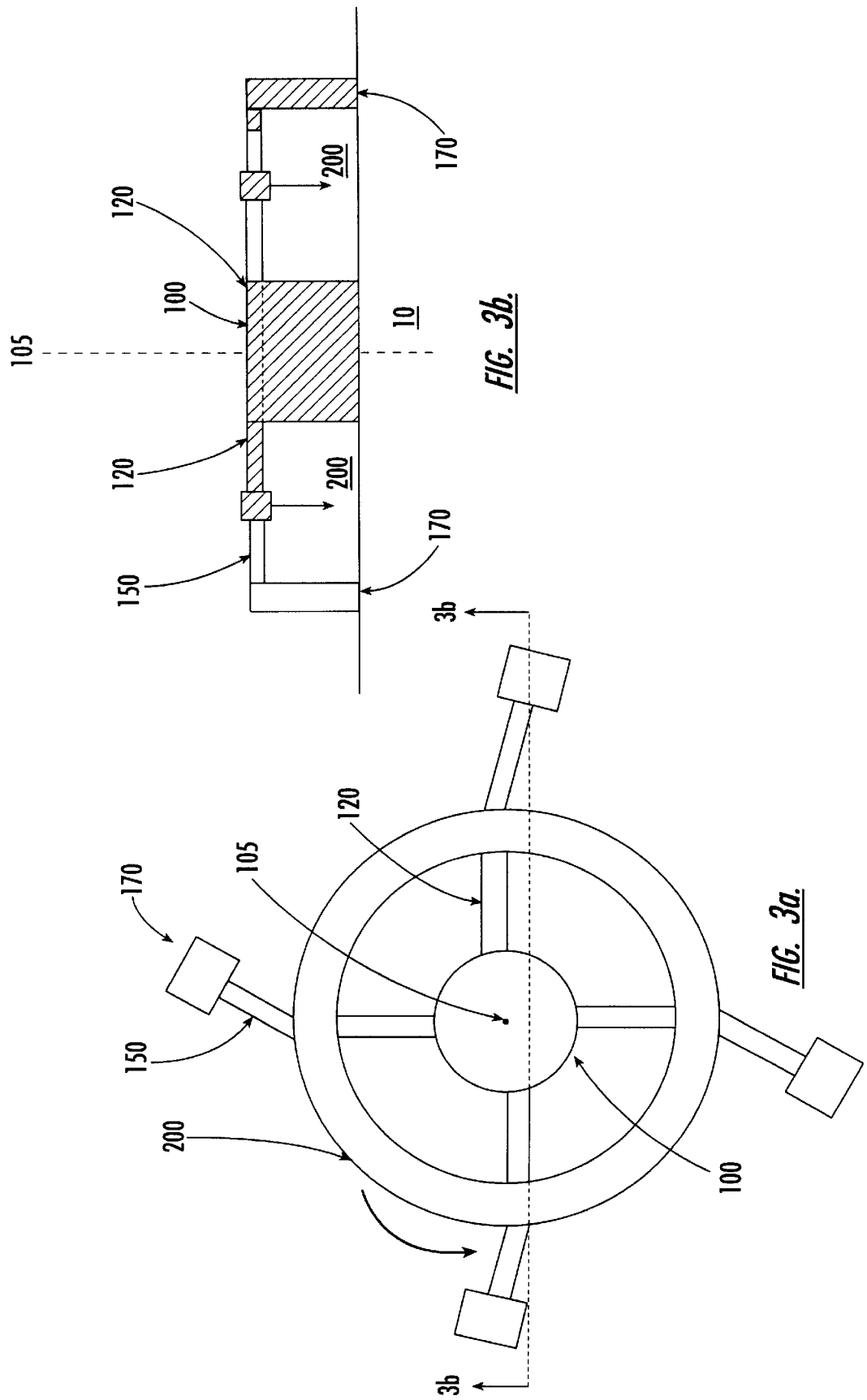

SINGLE BEAM

MULTIPLE BEAM

INTERNAL RESISTIVE
HEATING

INTERNAL RESISTIVE
HEATING

EXTERNAL HEATING

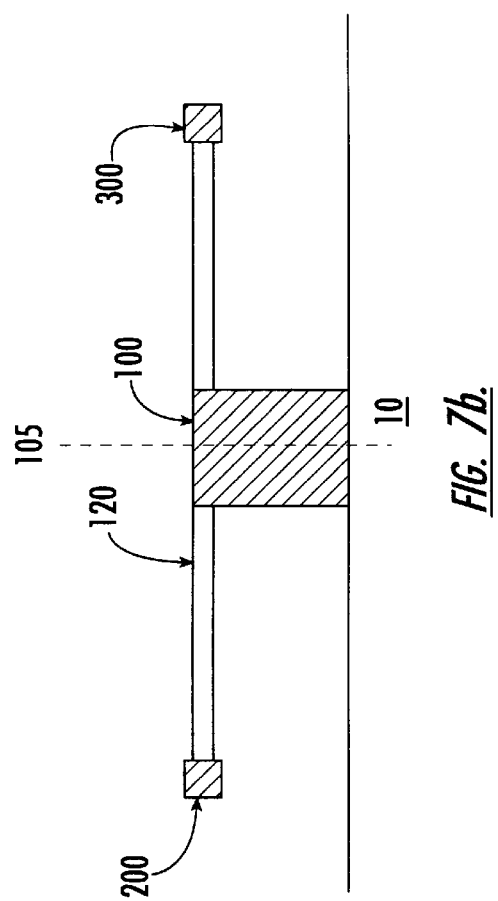
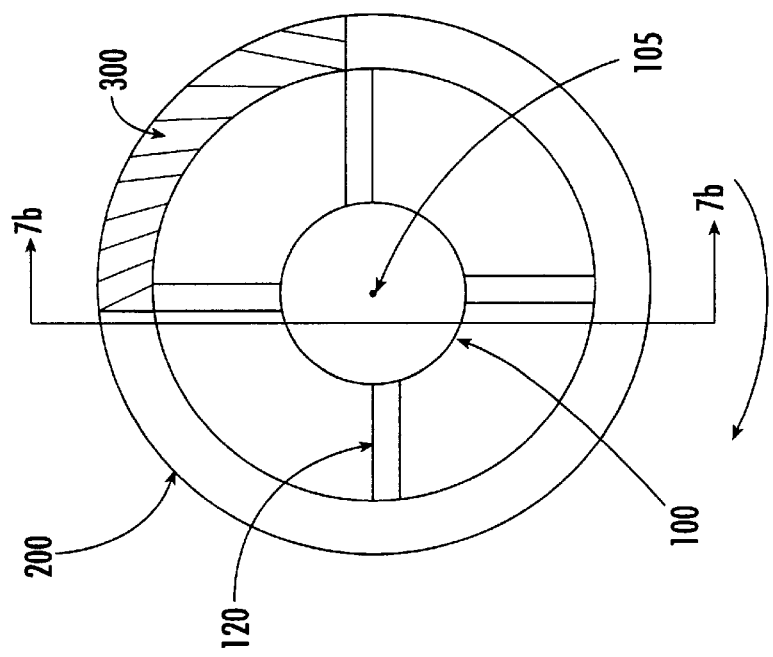
FIG. 7b.
FIG. 7a.

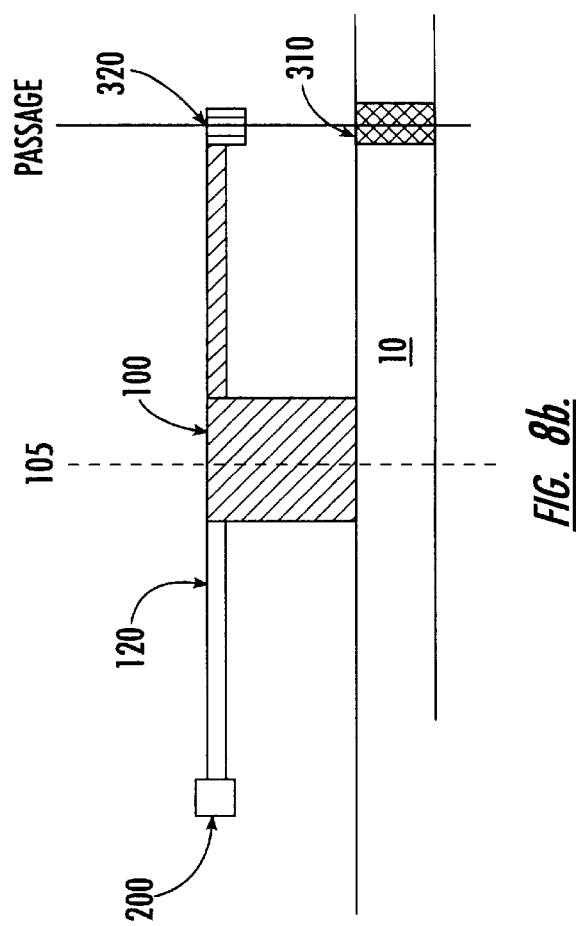
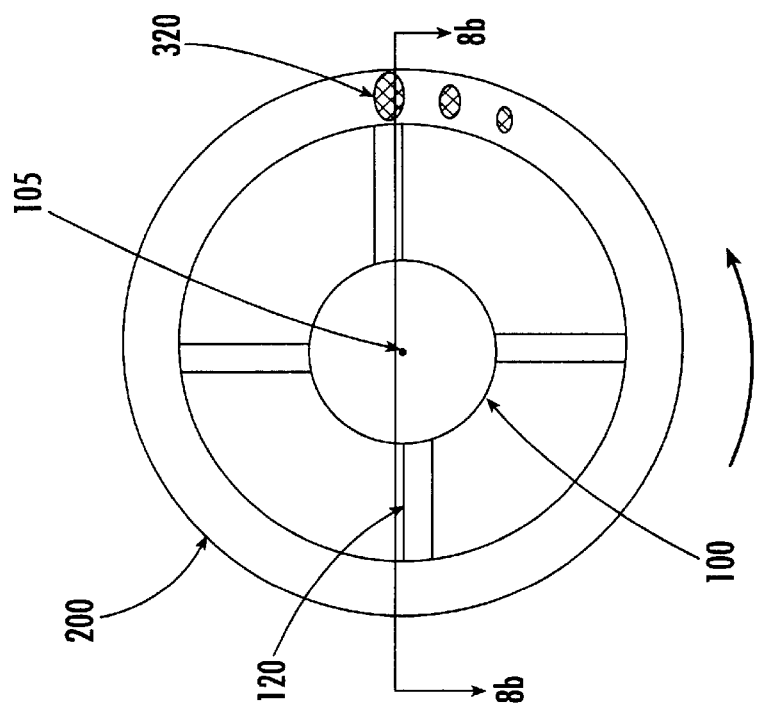
FIG. 8b.
FIG. 8a.

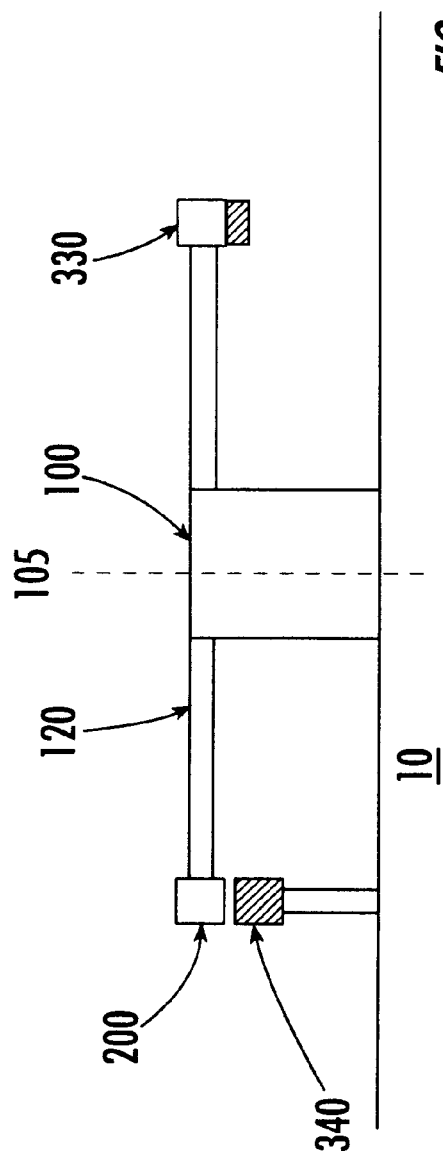
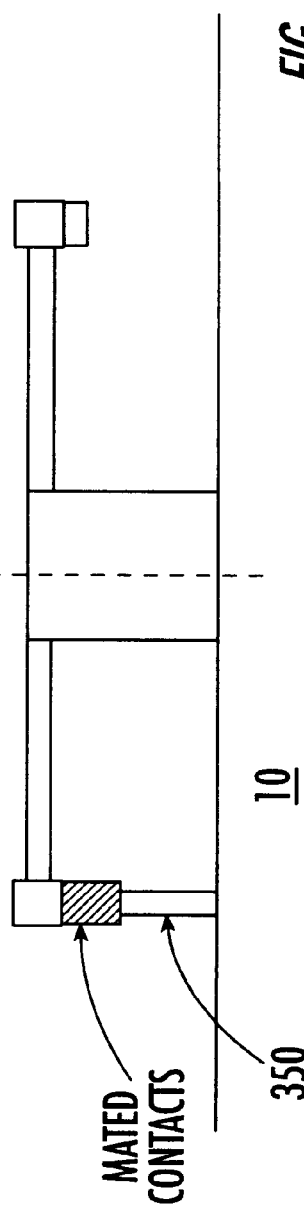

MICROELECTROMECHANICAL ROTARY STRUCTURES

FIELD OF THE INVENTION

The present invention relates to microelectromechanical structures, and more particularly to thermally actuated microelectromechanical rotary structures.

BACKGROUND OF THE INVENTION

Microelectromechanical structures (MEMS) and other microengineered devices are presently being developed for a wide variety of applications in view of the size, cost and reliability advantages provided by these devices. Many different varieties of MEMS devices have been created, including microgears, micromotors, and other micromachined devices that are capable of motion or applying force. These MEMS devices can be employed in a variety of applications including hydraulic applications in which MEMS pumps or valves are utilized and optical applications which include MEMS light valves and shutters.

MEMS devices have relied upon various techniques to provide the force necessary to cause the desired motion within these microstructures. For example, cantilevers have been employed to apply mechanical force in order to rotate micromachined springs and gears. In addition, some micromotors are driven by electromagnetic fields, while other micromachined structures are activated by piezoelectric or electrostatic forces. Recently, MEMS devices that are actuated by the controlled thermal expansion of an actuator or other MEMS component have been developed. For example, U.S. patent application Ser. Nos. 08/767,192; 08/936,598, and 08/965,277 are assigned to MCNC, the assignee of the present invention, and describe various types of thermally actuated MEMS devices. In addition, MEMS devices have been recently developed that include rotational connections to allow rotation with less torsional stress and lower applied force than found with torsion bar connections. For instance, U.S. patent application Ser. No. 08/719,711, also assigned to MCNC, describes various rotational MEMS connections. The contents of each of these applications are hereby incorporated by reference herein.

Regardless of the actuation source, most MEMS devices provide generally linear motion. As such, a need exists to provide MEMS devices that are capable of nonlinear motion, including rotational motion. MEMS devices can thereby be employed in a broader range of applications.

SUMMARY OF THE INVENTION

The present invention provides a microelectromechanical structure capable of rotation, thereby permitting the resulting MEMS structure to be employed in a wide variety of applications that require rotary motion. In one embodiment, the MEMS structure includes a microelectronic substrate and a hub structure affixed to a surface of the microelectronic substrate. The MEMS structure also includes one or more hub spoke members which extend outwardly from the hub. Preferably, each hub spoke member is disposed such that an imaginary line extending through at least a portion of each hub spoke member is displaced to some extent from the central axis of the hub. In other words, at least some portion of each hub spoke member is offset to some degree from the center of the hub from which the hub spoke member extends. According to this embodiment of the present invention, the hub spoke members are adapted to impose a rotational force on the hub in response to changes in the temperature of the hub spoke members. The rotational force is created by changes in the dimensions, typically the length, of the hub spoke member as the temperature varies.

The MEMS structure of one embodiment also includes a ring spaced apart from the microelectronic substrate and at least partially encircling the hub. The ring is attached to the hub spoke members such that the hub spoke members extend between the hub and the ring. In this embodiment, the hub spoke members are adapted to impose a rotational force on the ring in response to changes in the temperature of the hub spoke members such that the ring can rotate in either a clockwise or counterclockwise direction relative to the hub.

The MEMS structure of one embodiment also includes one or more anchors connected to a surface of the microelectronic substrate and one or more anchored spoke members disposed between the ring and respective ones of the anchor members. The anchored spoke members are adapted to respond to changes in temperature, such as by changing in length, in order to impose a rotational force on the ring. As before, this rotational force causes the ring to rotate relative to the hub in either a clockwise or counterclockwise direction.

The MEMS structure of one embodiment can include at least one microelectromechanical actuator connected to a hub spoke member for controllably moving the hub spoke member in response to thermal actuation. The microelectromechanical actuator includes at least two anchor members connected to the surface of the microelectronic substrate and at least one arched beam extending between the actuator members. In response to thermal actuation, the arched beam further arches, thereby causing the hub spoke member to move which, in turn, typically imparts a rotational force upon the hub. Alternatively, this MEMS structure can further include a ring, such that at least one microelectromechanical actuator is operably connected, not to a hub spoke member, but to a ring spoke member. As such, thermal actuation of one microelectromechanical actuator will cause the arched beam further arch, thereby causing the ring spoke member to move which, in turn, causes the ring to rotate.

Optionally, the MEMS structures of the foregoing embodiments can each include a plurality of microelectromechanical actuators. In one embodiment, the microelectromechanical actuators are configured to impart forces, which cause the hub and/or the ring to rotate in the same direction. In another embodiment, however, the MEMS structure includes first and second sets of microelectromechanical actuators. According to this embodiment, one set is configured to impart forces which cause the hub and/or ring to rotate in one direction, while the second set is configured to impart forces which cause the hub and/or ring to rotate in the opposite direction. The hub and/or the ring can therefore be rotated in either a clockwise or counterclockwise direction in response to the activation of the first and second sets of microelectromechanical actuators.

In one advantageous embodiment, at least a portion of the ring includes a reflective surface, thereby permitting the MEMS structure to selectively reflect light as it controllably rotates. In another embodiment, the ring defines at least one hole having an axis that intersects the surface of the substrate. As such, the position of the hole relative to the surface of the substrate varies as the ring rotates. Further, the microelectronic substrate of this embodiment of the MEMS structure can also define at least one hole which is alternately aligned and misaligned with the one or more holes defined in the ring as the ring rotates. As such, the MEMS structure of this embodiment defines a passage through the ring and alternatively the substrate to function as a valve or an optical shutter.

The MEMS structure of another embodiment includes a conductive surface disposed upon the surface of the microelectronic substrate and a complimentary conductive surface disposed on the ring overlying the substrate and spaced therefrom. As the ring rotates above the surface of the substrate, the area of overlap between the conductive surfaces varies such that the MEMS structure can function as a variable capacitor. Still further, the MEMS structure of another embodiment includes at least one contact affixed to the surface of the microelectronic substrate and at least one contact affixed to the ring. As the ring rotates, the contacts alternatively connect and disconnect such that the MEMS structure can serve as a switch. Further, the contacts can be electrically connected such that different amounts of electrical resistance can be selectively created as the ring rotates.

As a result of its construction, the MEMS structure of the present invention is adapted to provide rotary motion in a controlled fashion. As such, the MEMS structures can be used in a wide variety of applications, including valves, shutters, variable capacitors, switches, relays, and the like, at least some of which have been described above.

Although the foregoing invention will be described in some detail, it will be obvious that certain changes and modifications may be practiced within the scope of the invention described herein.

BRIEF DESCRIPTION OF THE FIGURES

FIG. 1(a) and FIG. 1(b) are respectively a top view and a cross-sectional view taken along line a—a of a simple mobile hub MEMS rotary structure according to one embodiment of the present invention.

FIG. 2(a) and FIG. 2(b) are respectively a top view and a cross-sectional view taken along line b—b of a mobile outer ring MEMS rotary structure according to one embodiment of the present invention.

FIG. 3(a) and FIG. 3(b) are respectively a top view and a cross-sectional view taken along line c—c of a mobile middle ring MEMS rotary structure according to one embodiment of the present invention.

FIG. 7(a) and FIG. 7(b) are respectively a top view and a cross-sectional view taken along line d—d of a MEMS rotary structure having a reflective surface according to one embodiment of the present invention.

FIG. 8(a) and FIG. 8(b) are respectively a top view and a cross-sectional view taken along line e—e of a MEMS rotary valve or shutter structure according to one embodiment of the present invention.

FIG. 9(a) and FIG. 9(b) are schematic side views of a MEMS rotary switch structure according to one embodiment of the present invention wherein contacts disposed on the ring and base substrate are respectively disconnected and connected.

DETAILED DESCRIPTION OF THE INVENTION

Figure 4A:
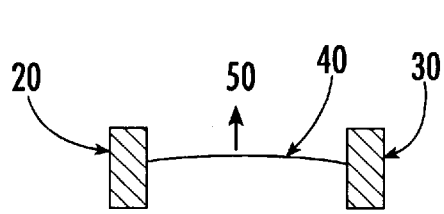
FIGS. 4(a) to 4(e) are top views of various MEMS TAB (thermal arched beam) structures according to one embodiment of the present invention.

The present invention will now be described more fully hereinafter with reference to the accompanying drawings, in which preferred embodiments of the present invention are shown. The present invention may, however, be embodied in many different forms and should not be construed as limited to the embodiments set forth herein; rather, these embodiments are provided so that this disclosure will be thorough and complete, and will fully convey the scope of the present invention to those skilled in the art. Features in the drawings are not necessarily to scale, but merely serve to illustrate the present invention. Like numbers refer to like elements throughout.

Mobile Hub

A MEMS rotary structure according to one embodiment is shown by a top view in FIG. 1(a) and a cross sectional view taken through line a—a in FIG. 1(b). The MEMS rotary structure of this embodiment comprises a hub 100 disposed upon and suspended above the surface of a microelectronic substrate 10 and at least two hub spoke members 110 extending radially outward from the hub and spaced from the substrate by a gap 175. The hub spoke members are adapted to impose rotational forces on the hub in response to changes in temperature, as described below. While the hub is shown to be a solid cylindrical element, the hub can have other shapes and need not be solid, but can be tubular or the like.

Typically, the microelectronic substrate is formed of silicon. However, the microelectronic substrate can be formed of other materials, such as glass or other semiconductors. In addition, the hub and the hub spoke members are typically formed of a metal, such as nickel, that is deposited through an integrated circuit manufacturing process, such as by electroplating, upon the substrate in the same manner as described in conjunction with the thermal arched beam actuators by U.S. patent application Ser. Nos. 08/767,192, 08,965,277 and 08/936,958; the contents of which have been incorporated by reference. However, the MEMS rotary structure and, in particular, the hub and the hub spoke members can be formed by different techniques and of different materials, including silicon, without departing from the spirit and scope of the present invention.

As shown in FIGS. 1(a) and 1(b), the hub 100 defines a central axis 105 that intersects the surface of the microelectronic substrate. In addition, each hub spoke member 110 defines an imaginary line extending lengthwise therethrough. According to the present invention, each hub spoke member is connected to the hub, but is displaced somewhat from the central axis of the hub. In this regard, the imaginary line extending lengthwise through each hub spoke member intersects the hub at a location offset somewhat from the central axis of the hub. As such, the hub spoke members can impart torque and rotational force to the hub as the hub spoke members expand or contract during thermal actuation.

As illustrated in FIGS. 1(a) and 1(b), the MEMS rotary structure of this embodiment also includes at least two anchor members affixed to the substrate. Each anchor member is preferably formed by the same process and of the same material, such as nickel, as the hub and the hub spoke members. Further, each hub spoke member extends between the hub and a respective anchor member, although each hub spoke member is somewhat offset from the central axis of the hub as described above. Since one end of each hub spoke member is affixed to the substrate via the anchor member, when the hub spoke member is heated and expands, the hub spoke member will apply a force to the hub that will tend to cause the hub to rotate in one direction or sense as a result of the offset between the hub spoke member and the central axis of the hub. Further, when the hub spoke is cooled and contracts, the hub spoke applies rotational force to the hub causing the hub to rotate in the opposite sense. In either case, clockwise or counterclockwise rotation can be provided depending on where the hub spoke is affixed to the hub relative to the center axis of the hub and whether the hub spoke is heated or cooled. Those skilled in the art will appreciate that the hub spoke member can be heated or cooled by using many different techniques. For instance, the ambient temperature of a hub spoke member can be altered by changing the ambient temperature, selectively applying fluid or gasses, or selectively passing electrical current.

Mobile Outer Ring

FIGS. 2(a) and 2(b) illustrate a MEMS rotary structure according to another embodiment that includes a mobile outer ring. As described above, the MEMS rotary structure of this embodiment includes a hub 100 affixed to the surface of a microelectronic substrate 10 and at least two equally spaced hub spoke members adapted to impose rotational forces to the hub in response to changes in temperature. As before, the hub 100 defines a central axis 105 that intersects the surface of the microelectronic substrate. Each hub spoke member 120 extends outwardly from the hub 100 so as to define a lengthwise extending imaginary line. As described above, each hub spoke member is displaced somewhat from the central axis of the hub in order to provide torque and rotational force to the hub as the hub spoke member expands or contracts.

Although a MEMS rotary structure need only include two hub spoke members, the MEMS rotary structure generally includes three or more hub spoke members extending outwardly from the hub. As noted above, hub spoke members are included in both hub and hub and ring MEMS rotary structures. While the hub spoke members can be arranged in different configurations, the hub spoke members are generally spaced in equal angular increments about the hub. For example, the MEMS rotary structure can include four hub spoke members spaced in equal 90° increments about the hub as shown in FIGS. 1(a) and 2(a).

In addition, the MEMS rotary structure of this embodiment further comprises a ring 200 spaced apart from the microelectronic substrate. The ring 200 at least partially encircles the hub 100, and is connected to the hub through at least two hub spoke members 120. As such, each hub spoke member extends between the hub and the ring. In operation, when the hub spoke is heated and expands, the hub spoke therefore applies rotational force in one sense to the ring. In addition, when the hub spoke is cooled and contracts, the hub spoke applies rotational force to the ring in the opposite sense. It is important that the hub spoke members are maintained at a different temperature, either hotter or cooler, relative to the ring when thermal actuation is applied to cause rotation. Numerous techniques may be used to thermally actuate the hub spoke members. Indirect heating proximate the hub spoke members may be used. Preferably, direct heating can be provided by conducting electrical current through the hub spoke members, as described below.

As shown in FIG. 2(a), the hub can comprise two generally semicircular portions separated by an air gap 106. By applying a voltage differential between the two portions of the hub, for instance first portion 102 and second portion 103 as shown, current can flow through the MEMS rotary structure as shown in FIG. 2(a), thereby directly heating the hub spoke members and causing thermal actuation thereof. In particular, pairs of hub spoke members are disposed between the ring and the first and second portions of the hub, respectively, and are adapted for thermal actuation as a result of the direct heating created by the electrical current flowing between the two portions of the hub.

Mobile Middle Ring

As depicted in FIGS. 3(a) and 3(b), the MEMS rotary structure of FIGS. 2(a) and 2(b) can be modified to include at least two anchored spoke members 150 and at least one corresponding anchor 170. More preferably, the MEMS rotary structure of this embodiment includes a plurality of anchored spoke members spaced in equal angular increments about the ring and an equal number of anchors associated with respective anchored spokes. Each anchored spoke member 150 is disposed between the ring 200 and the corresponding anchor 170. While the anchored spoke member is spaced from the substrate as shown in FIG. 3(b), the anchor 170 is affixed to the surface of the microelectronic substrate 10 and serves to support the anchored spoke member 150.

The MEMS rotary structure of this embodiment includes both hub spoke members and anchored spoke members. Either the hub spoke members, the anchored spoke members, or both may be thermally actuated so as to cause the hub and the ring to rotate. For this embodiment, the hub can be either suspended above or affixed to the surface of the base microelectronic substrate. In the illustrated embodiment, the anchored spoke members are adapted to impart rotational forces to the ring and, in turn, to the hub since the anchored spoke members are disposed at a non-orthogonal angle relative to the ring. As such, expansion and contraction of the anchored spoke members in the lengthwise direction will cause the ring to rotate. Since the ring is tied to the hub by the hub spoke members, rotation of the ring will cause the hub to rotate. Since the anchored spoke members are adapted to rotate the MEMS rotary structure of the illustrated embodiment, the hub spoke members need not be offset from the center axis of the hub as described above in conjunction with other embodiments.

In operation, when an anchored spoke of the MEMS rotary structure of FIGS. 3(a) and 3(b) is heated and expands, the heated spoke applies rotational force in one sense to the hub and ring. Conversely, when the anchored spoke is cooled and contracts, the cooled spoke applies rotational force to the hub and ring in the opposite sense. In addition to imparting rotational motion with the anchored spoke members, the hub spoke members can impart rotational motion in the manner described in conjunction with the prior embodiments. Those skilled in the art will understand that the anchored spoke member and the hub spoke members can be disposed to provide rotational force in the same or opposite sense in response to changes in temperature. That is, the spokes can cooperate to provide rotation in the same sense, or the spokes can be disposed to provide rotation in opposite directions. Rotation may be varied in several ways in this embodiment. For instance, altering the placement of the spokes with respect to the central axis of the hub can vary the rotation. For example, a spoke displaced farther from the central axis can provide greater rotational force. Those skilled in the art will therefore appreciate that the MEMS rotary structure of this embodiment provides improved rotational displacement and additional modes of rotation as compared with the prior embodiments. Importantly, those skilled in the art will appreciate that actuators other than those driven by thermal arched beams can be used to provide rotational force to all embodiments of the MEMS rotary structures of the present invention.

TAB Driven Mobile Hub

Figure 5A:
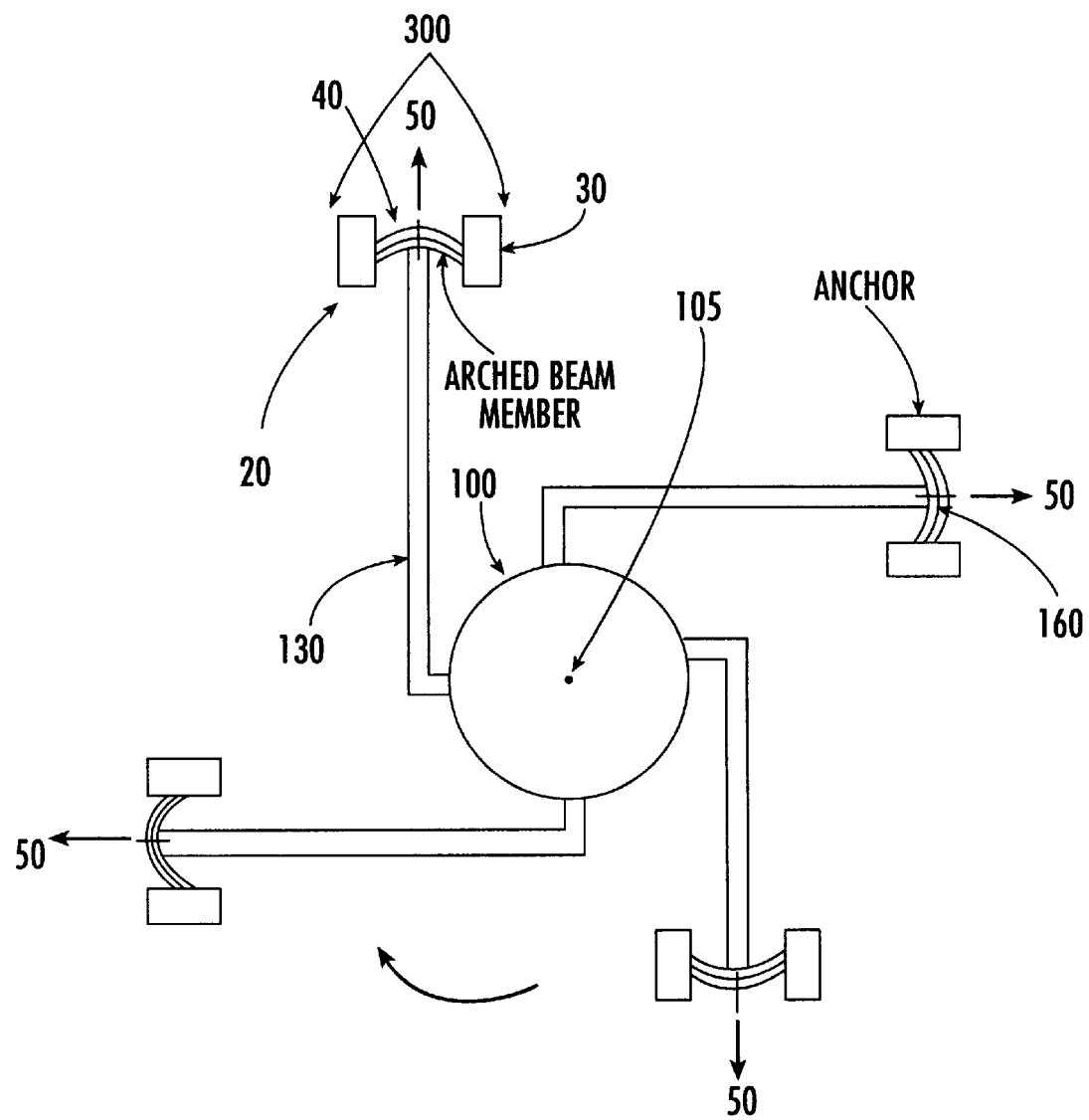
FIG. 5 (a) and FIG. 5(b) are top views of two alternative embodiments of a mobile hub rotary structure according to the present invention in which TAB actuators impose rotational force upon the mobile hub.
Figure 5B:
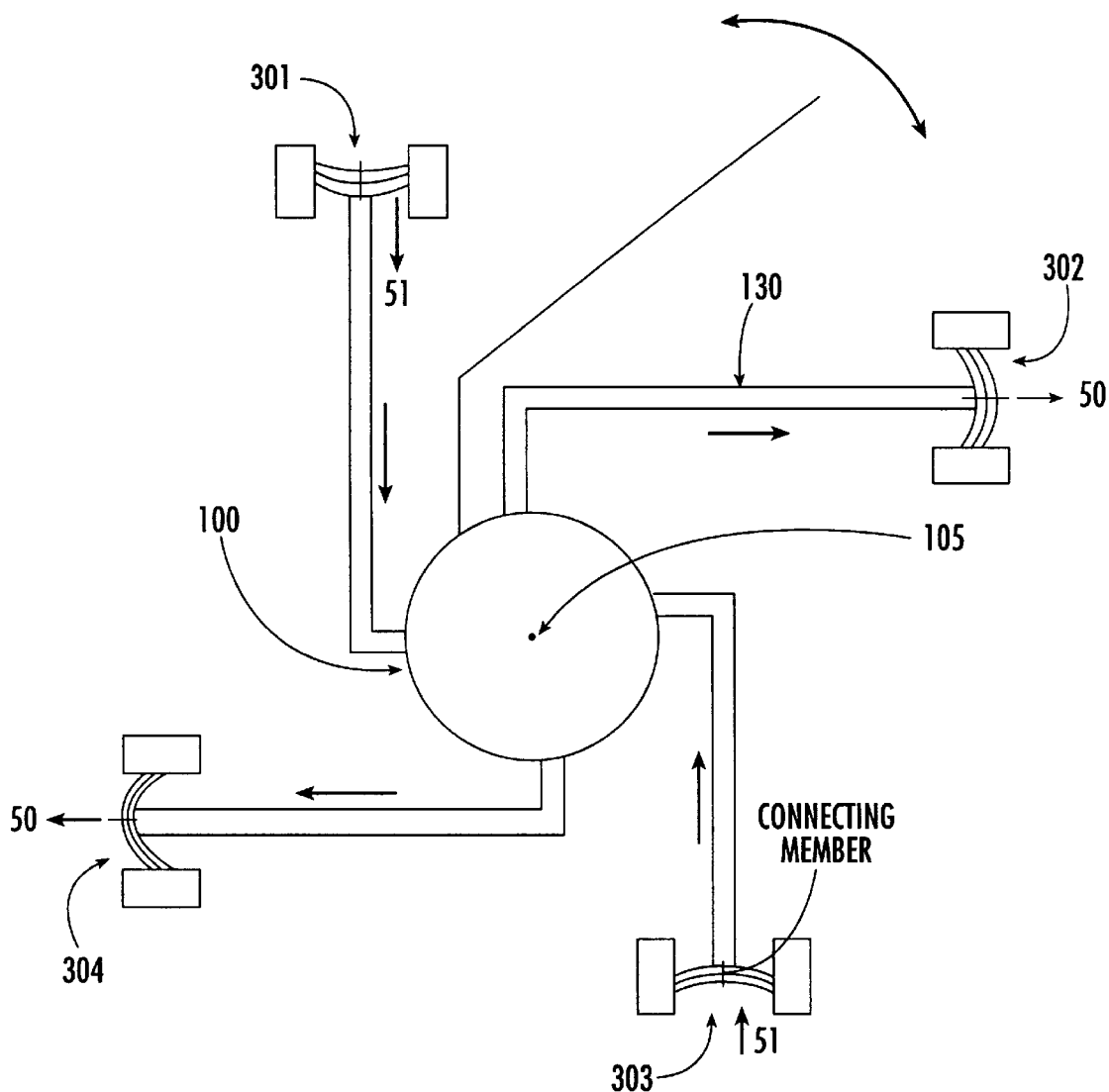

FIGS. 5(a) and 5(b) illustrate the MEMS rotary structure of another embodiment of the present invention. While the hub spoke members can be linear as illustrated in conjunction with prior embodiments, the hub spoke members can be non-linear as shown in FIGS. 5(a) and 5(b). In order to impart rotational forces to the hub, however, the imaginary line extending lengthwise through at least a portion of the hub spoke member must be offset from the center axis of the hub. As such, rotational forces will be imparted to the hub even if the imaginary line extending lengthwise through other portions of the hub spoke member does extend through the center axis.

The MEMS rotary structure of this embodiment also includes one or more TAB microelectromechanical actuators disposed on the surface of the microelectronic substrate. Each actuator is coupled to a respective hub spoke member in order to move the hub spoke member in response to thermal actuation. Although the hub spoke member can also be thermally responsive as described in conjunction with the other embodiments, the hub spoke member of the embodiment need not be formed of a material that significantly changes in length in response to temperature changes since the microelectromechanical actuators provide ample motive force.

While the microelectromechanical actuators can have many different embodiments, the microelectromechanical actuators preferably include the thermal arched beam (TAB) actuators described by U.S. patent application Ser. No. 08/767,192, the contents of which have been incorporated by reference. In this regard, various TAB actuators are depicted in FIG. 4.

FIG. 4(a) illustrates one embodiment of a TAB actuator having a single arched beam. As shown, the TAB actuator is constructed on a base microelectronic substrate 10. The TAB beam actuator comprises two supports 20 and 30 affixed to the base microelectronic substrate, and an arched beam 40 extending between both supports. The ends of the arched beam are affixed to the supports so that the arched beam is held in place above the surface of the base microelectronic substrate. The supports and the arched beam are preferably constructed from a conductive metal, such as electroplated nickel, but alternatively may be constructed from a semiconductor, such as silicon. In any event, the arched beam should be constructed from a material that expands or contracts in response to changes in temperature. Typically, the beam is comprised of a material with a positive coefficient of thermal expansion that expands with increases in temperature. However, the beam can also be created from material that has a negative coefficient of thermal expansion that contracts as temperature increases. As shown, the single beam is arched in a predetermined direction 50 such that thermal expansion will cause the beam to further arch in the same direction.

The TAB actuator can also include means for altering the temperature of the single arched beam by applying or removing heat therefrom. When the temperature of an arched beam is modified, the arched beam expands in the direction shown by the arrow or contracts in the direction opposite to the arrow. Various means may be used to heat or cool a single beam and thereby cause the beam to expand or contract. Current flowing through the beam can generate heat directly within the beam, or alternatively indirect external heaters may be used. The flow of gases or liquids around the arched beam may also be used to heat or cool an arched beam. Combinations of these and other techniques for heating or cooling may be used within the present invention.

Figure 4B:
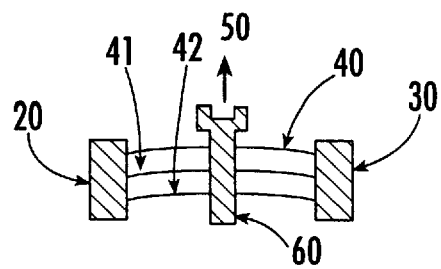
Figure 4C:
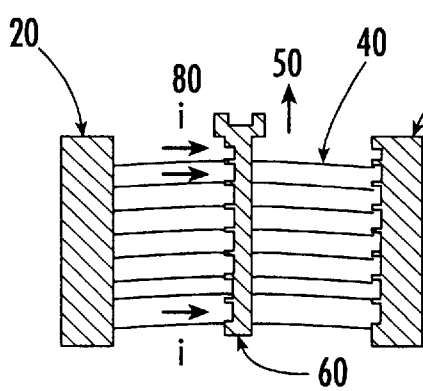

Another embodiment of a TAB actuator is shown in FIG. 4(b). As illustrated herein, the TAB actuator can include two or more arched beams 40, 41, and 42 that extend between supports 20 and 30. Further, the TAB actuator of this embodiment can include at least one coupler 60 for interconnecting two or more arched beams. The coupler allows the forces created by the plurality of beams to be combined to provide greater force, greater displacement, and a stiffer and more robust actuator design. Those skilled in the art will appreciate that any number of arched beams and couplers can be used within the present invention. For instance, FIG. 4(c) shows an eight beam TAB actuator. When the arched beams are heated, the beams expand thereby further arching in the predetermined direction. As such, the coupler moves in the direction of the arrow 50 when at least one beam is heated and expands. Conversely, the coupler moves in a direction opposite to the arrow 50 when at least one beam is cooled and contracts. Those skilled in the art will understand that the arched beams are preferably arched in the same direction, although alternative arrangements of arched beams in which some of the beams are arched in a different or opposite direction are possible. As with the single arched beam, the TAB actuator can include various means to heat or cool one or more of the plurality of arched beams.

Figure 4D:
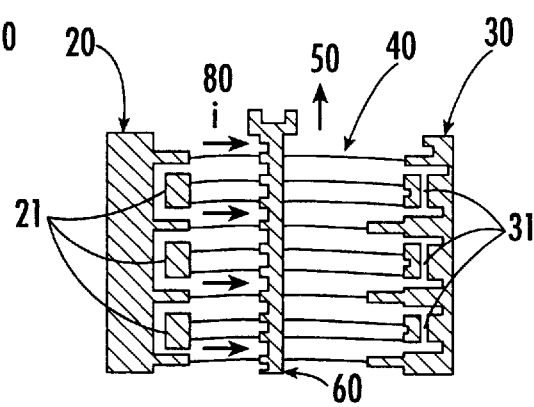
Figure 4E:
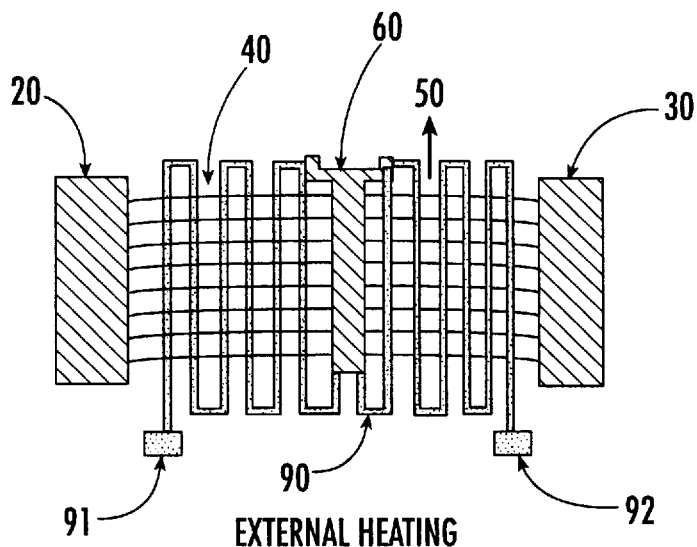

FIG. 4(c) illustrates one embodiment of a TAB actuator that employs direct heating of the arched beams. In this case, current is passed through each arched beam to provide direct resistive heating of the beams, thereby causing each beam to expand and arch further in the predetermined direction 50. FIG. 4(d) shows another embodiment of a TAB actuator wherein only a subset of the arched beams are directly heated by passing current therethrough. As shown in this example, alternating beams carry current i and are directly heated, while the remaining beams are unheated or are indirectly heated from the adjacent current carrying beams. The remaining beams do not carry current because they are electrically isolated from the current carrying beams and from the supports 30 by insulators 21 and 31. Those skilled in the art will understand that different combinations of direct and indirect heating may be used, and that the current carried by the arched beams need not be equal. FIG. 4(e) illustrates another embodiment of a TAB actuator having an external heater 90 disposed upon a substrate arranged in a serpentine pattern to heat the ambient and in turn, the arched beams. As shown, contacts 91 and 92 are used to electrically energize the external heater 90 which is typically constructed from a conductive metal or a semiconductor material.

Having described some representative TAB actuators, we return to the discussion of the MEMS rotary structure embodiments shown in FIGS. 5(a) and 5(b). Regardless of the type of TAB actuator, each hub spoke member 130 is operably connected to both a TAB actuator 300 and the hub 100, and serves to transmit rotational force from the TAB array to the hub. Each hub spoke member is operably connected to the arched beams of the respective TAB actuators such that thermal actuation of the TAB actuator will cause the arched beams to further arch in a predetermined direction, thereby also moving the hub spoke members in the predetermined direction. Each hub spoke member is thereby disposed to impart rotational force to the operably connected hub. Although the illustrated embodiment does not include a ring, the MEMS rotary structure may optionally further include a ring as well as corresponding spoke members disposed between the ring and the hub as previously described.

TAB actuators can be disposed to rotate a hub in either a clockwise or counterclockwise direction within a particular MEMS rotary structure. For the example shown in FIG. 5(a), TAB actuators are collectively disposed to provide clockwise rotational forces to the hub. In contrast, another example illustrated in FIG. 5(b), includes TAB actuators alternately disposed to provide both clockwise and counterclockwise rotation within a MEMS rotary structure. Depending on which TAB actuators are heated within FIG. 5(b), the hub may be selectively rotated in a clockwise and counterclockwise direction. For instance, TAB actuators 302 and 304 cooperate to move hub spoke 130 in direction 50 and thereby rotate the hub 100 in a clockwise sense. In contrast, TAB actuators 301 and 303 cooperate to move hub spoke 130 in direction 51 and thereby provide counterclockwise rotation to the hub.

MEMS Rotary Structure Having a Lever

Figure 6B:
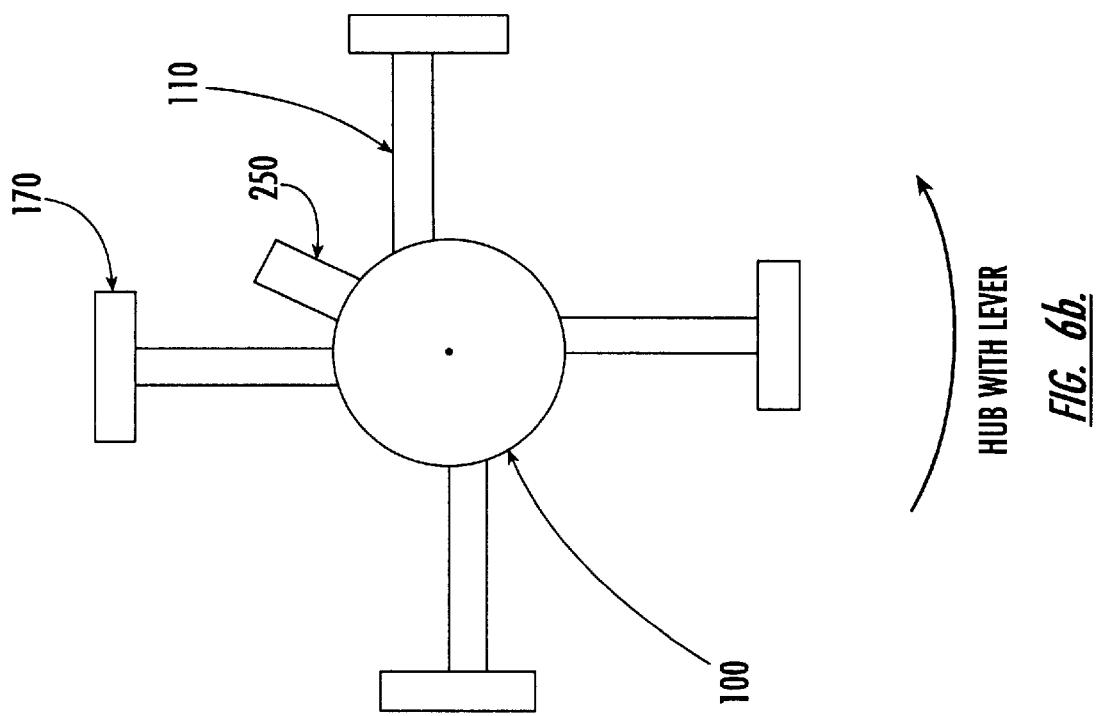
FIG. 6(a) and FIG. 6(b) are top views of two alternative embodiments of MEMS rotary structures according to the present invention that include a lever extending radially from the ring and hub, respectively.
Figure 6A:
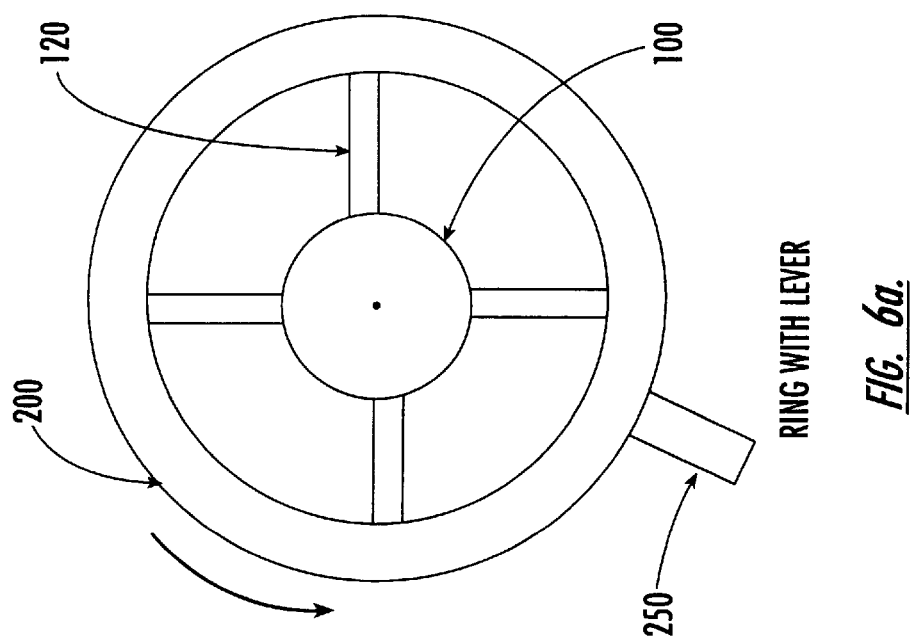

The various embodiments of the MEMS rotary structure described above can be employed in a wide variety of applications, including use as an actuator, a temperature sensor, or the like. However, the MEMS rotary structures of the present invention can include other features that adapt the MEMS rotary structure to still other applications. In this regard, FIGS. 6(a) and 6(b) illustrate an optional modification that can be made to the MEMS rotary structures discussed above. A lever 250 may be added to any ring structure as shown in FIG. 6(a). In addition, as shown in FIG. 6(b), a lever 250 may be added to any hub structure described herein. The lever is affixed to and can extend outwardly from the hub or ring as shown. In addition, the lever may be disposed to extend inwardly from the ring toward the hub. Further, a hub or ring can include levers extending outwardly and inwardly therefrom in combination, or disposed in some other configuration. In any case, the lever will rotate with the hub and/or ring and can be used to transmit force. Those skilled in the art will understand that the lever can allow numerous other structures to be selectively activated as the hub or ring rotates. The applications of the MEMS rotary structure that includes a lever encompass, but are not limited to, switches, relays, fluid valves and pumps, electromagnetic shutters, and other actuator driven devices.

MEMS Rotary Structure Having a Reflective Surface

FIGS. 7(a) and 7(b) describe a MEMS rotary structure having a reflective surface. In the illustrated embodiment, at least a portion of the surface of a ring 200 as a reflective surface 300. The reflective surface 300 may be disposed on the upper surface, lower surface, or along the perimeter of the ring. The reflective surface may be applied as a layer or coating on the ring using microengineering techniques. For example, the reflective surface could be applied as a reflective metal layer, such as a layer of gold. Alternatively, the reflective surface could be created by processing the surface of the ring. For instance, if the ring is formed of silicon, a reflective surface may be created by polishing the silicon. Preferably, as the ring rotates, the reflective portion of the ring surface can be selectively rotated into and out of the path of light. Therefore, the reflective surface may be used to reflect light or to act as a light valve or shutter. If the reflective surface is formed of a conductive material, the reflective surface may be used to absorb or block electromagnetic energy. For example, a metallic reflective surface could be used to selectively block radio frequency energy. Those skilled in the art will understand that other applications are possible for a MEMS rotary structure having a controllably rotated reflective surface.

Valve and Shutter Ring Structures

As shown in FIGS. 8(a) and 8(b), the MEMS rotary structure can be employed as a valve or a shutter with only slight modifications. As illustrated, the ring can define a first hole 320 that has an axis intersecting the surface of the microelectronic substrate 10. In addition, a second hole 310 may be defined through the microelectronic substrate 10. The first and second holes are disposed such that the first hole 320 through the ring and the second hole 310 through the microelectronic substrate 10 may be selectively aligned upon rotation of the ring to provide a passage through the ring and the microelectronic substrate. Once the ring has been rotated to bring the first and second holes into alignment, gasses, fluids, solids, or electromagnetic radiation can pass through the ring and the substrate. In instances in which the ring has not been rotated and the first and second holes are not aligned, the MEMS rotary structure will block the passage of gas, fluids, etc. As such, the MEMS rotary structure of the embodiment can serve as a valve, a shutter, or the like. Those skilled in the art will appreciate that the applications for the MEMS rotary structures of this embodiment are not limited to the applications described above. Moreover, the MEMS rotary structure of this embodiment can be designed such that the first and second holes are aligned while the MEMS rotary structure is at rest, i.e., unactivated, and are misaligned once the MEMS rotary structure has been activated.

As shown in FIG. 8(a), the ring may also contain more than one hole. The holes may assume various sizes, shapes, locations, and relative separations along the circumference of the ring. Further, more than one hole may be provided in the substrate. Again, the holes may assume various sizes, shapes, locations, and relative separations in the substrate. As required in a given application, one or more holes may be provided in the ring and/or substrate to serve as a valve or shutter. One or more holes in the ring and one or more holes in the substrate may be selectively aligned to define one or more passages therethrough.

Rotary Switch Ring Structures

FIGS. 9(a) and 9(b) illustrate a MEMS rotary structure that has been designed to operate as a rotary switch. The MEMS rotary structure includes a first electrical contact 330 provided as part of the ring or affixed to the surface of the ring 200. In addition, the MEMS rotary structure includes a complimentary second electrical contact 340 affixed to the surface of the microelectronic substrate 10. As shown in FIGS. 9(a) and 9(b), the second electrical contact 340 may be held in position by support 350 above the microelectronic substrate so as to be disposed proximate the first electrical contact. Although not shown, a first conductive path is provided through or along the ring of the hub spoke member and the hub for the first electrical contact, and a second conductive path is provided through or along the substrate for the second electrical contact for providing electrical current to each contact. Although the second electrical contact is disposed in a fixed position with respect to the microelectronic substrate, the first electrical contact is rotated with the ring as the ring rotates relative to the substrate. The first and second contacts may be selectively aligned as the ring rotates in order to controllably interconnect the first and second electrical contacts. In this manner, the MEMS rotary structure can operate as an electrical switch or relay. Although one advantageous embodiment is illustrated, those skilled in the art will understand that the first and second contacts may be otherwise disposed on the ring and microelectronic substrate while still allowing this structure to function as a rotary electrical switch or relay. For example, the MEMS rotary structure can include a partial ring to permit the first and second contacts to interconnect on a plane perpendicular to the surface of the microelectronic substrate. Further, the electrical contacts on the ring and substrate may be disposed in other arrangements suitable for several other applications, such as a variable resistor, or potentiometer for instance. To serve as a variable resistor, the electrical contacts remain electrically connected as the MEMS rotary structure rotates, such that an electrical resistance is maintained between the contacts. The electrical resistance may be formed by the electrical contacts or provided as a separate device connected to the electrical contacts. As the MEMS structure rotates, the amount of the electrical resistance is selectively changed such that the MEMS rotary structure of this embodiment can serve as a variable resistor.

Variable Capacitor Ring Structures

Figure 10A:
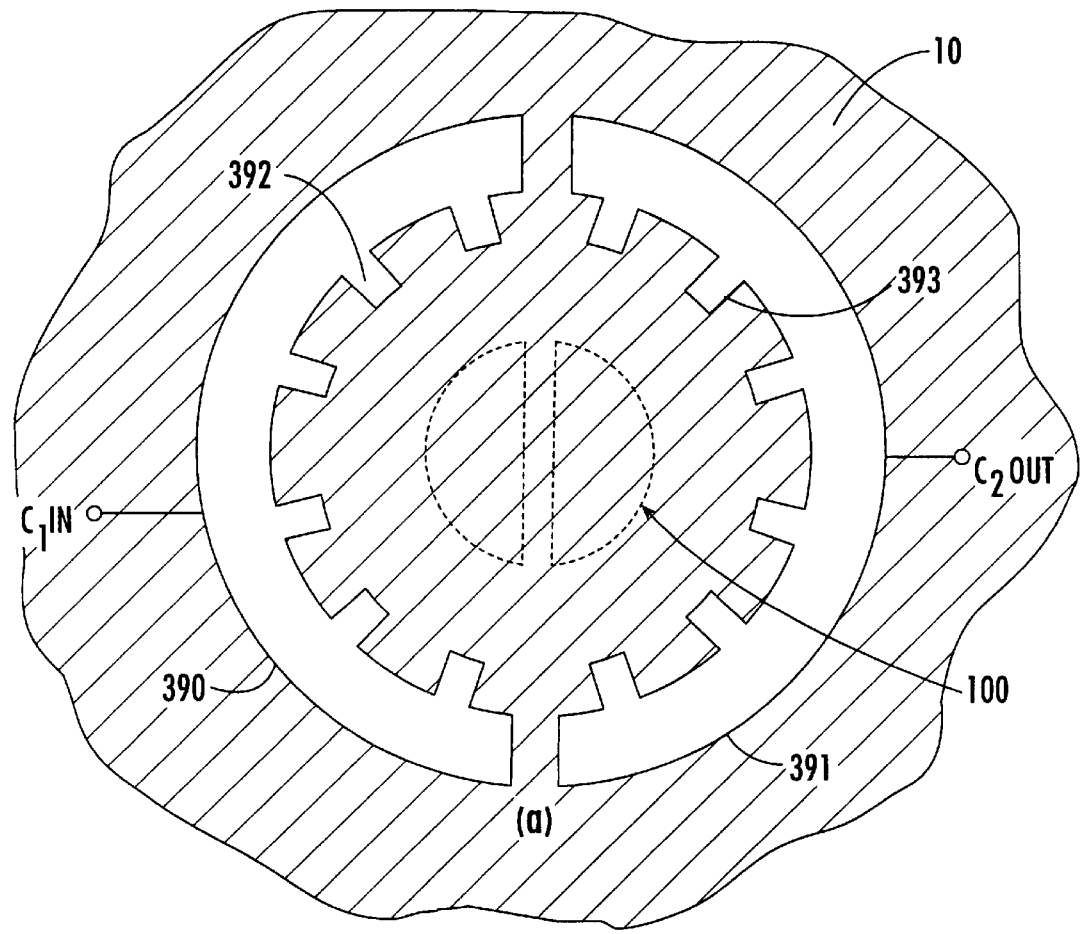
FIG. 10(a), FIG. 10(b), and FIG. 10(c) are two top views and a cross-sectional view taken along line 10C—10C of a MEMS variable capacitor rotary structure according to one embodiment of the present invention wherein the degree of overlap between conductors is altered to vary the capacitance therebetween.
Figure 10B:
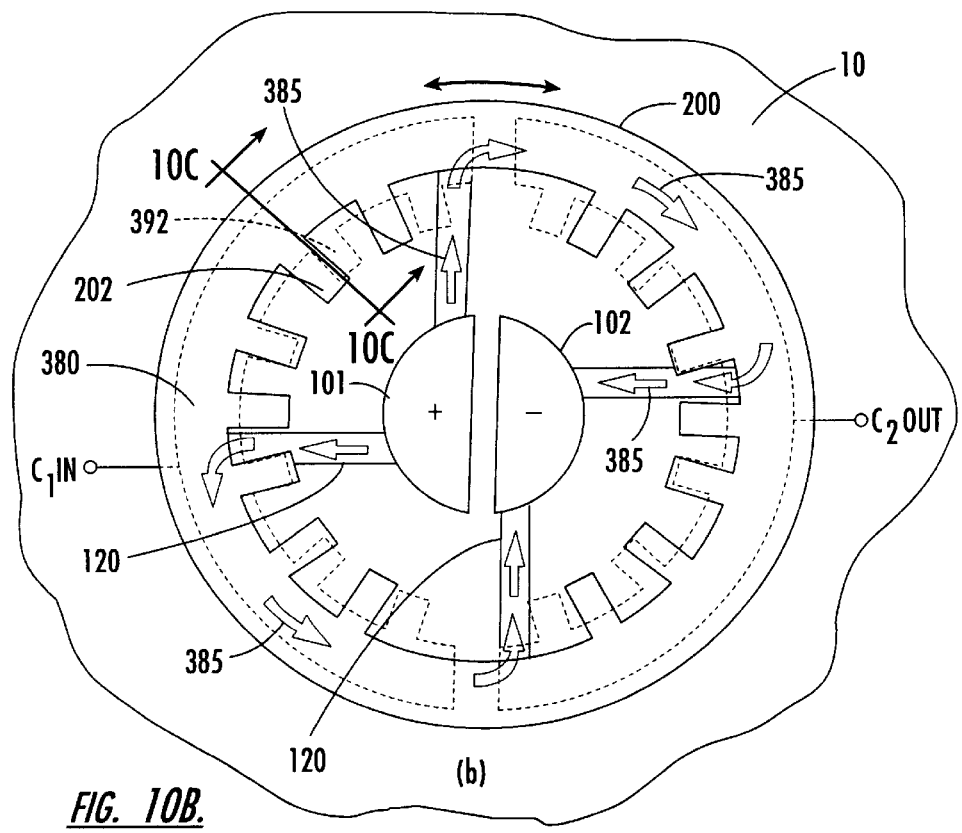
Figure 10C:
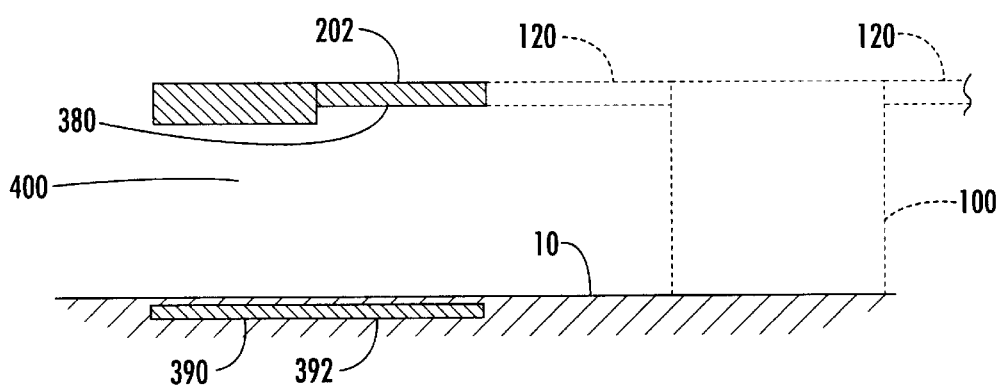

FIGS. 10(a)–(c) demonstrate a MEMS rotary structure that has been adapted to function as a variable capacitor. One or more variable capacitors may be formed by a MEMS rotary structure. To form a variable capacitor, the MEMS rotary structure includes a first electrically conductive surface, typically formed of gold, disposed on the surface of the microelectronic substrate 10, as shown in FIG. 10(a). Preferably, the first electrically conductive surface is covered and protected by an insulating layer, typically formed of silicon nitride, which is disposed thereupon. The first electrically conductive surface includes a first plate 390 corresponding to a first variable capacitor C1 as shown. Optionally, the first electrically conductive surface further includes a second plate 391, electrically insulated from the first plate and forming a second variable capacitor C2. The first and second plates can each include one or more teeth formed from the respective plates, for instance, first plate 390 having teeth 392 and second plate 391 having teeth 393 as shown in FIG. 10(a). Those skilled in the art will appreciate that various shapes and positional orientations of the first and second plates may be used while implementing a variable capacitor according to the present invention.

As shown in FIG. 10(b), the MEMS rotary structure of this embodiment also includes a complimentary second electrically conductive surface 380 disposed upon or carried by the ring 200 and at least partially overlying the first electrically conductive surface 390. The second electrically conductive surface on the ring preferably includes one or more teeth, as shown. In FIG. 10(b), the first electrically conductive surface including the first and second plates is shown by dashed lines. Preferably, the first and second plates of the first electrically conductive surface are disposed concentrically with respect to the ring and the second electrically conductive surface. The first and second conductive surfaces are preferably disposed proximate to and facing each other, separated only by a small air gap or a thin layer of insulating dielectric material denoted as area 400 in FIG. 10(c).

Preferably, the overlap and resulting capacitance between the first and second conductive surfaces can be selectively varied as the ring rotates. Accordingly, there are numerous techniques and structures that can be used to create variable capacitor embodiments according to the present invention. In one embodiment, one or more teeth of the first electrically conductive surface, or more particularly the first or second plates, can selectively overlap one or more teeth of the second electrically conductive surface as the ring rotates. For instance, as shown in FIG. 10(b), as the ring rotates the respective teeth can overlap partially, totally, or not at all such as to vary the capacitance therebetween. For example, tooth 392 on the first plate of the first electrically conductive surface overlies and partially overlaps tooth 202 of the second electrically conductive surface on the ring, as shown in by the plan view in FIG. 10(b) and in cross-section in FIG. 10(c). Preferably, teeth disposed on the ring and the substrate are interlaced such that the overlap between teeth disposed on the first and second electrically conductive surfaces varies as the ring rotates, thereby providing a variable capacitance. Those skilled in the art will understand that teeth may be provided in many sizes and shapes within the spirit of the present invention, such as rectangular, square, rounded, or other shapes of teeth. As the ring rotates, linear, nonlinear, logarithmic, or other variations in capacitance can be provided according to the placement of the overlapping teeth. Further, the capacitance can be rotatably varied between a minimum value and a maximum value as the overlap between the teeth is respectively minimized or maximized.

However, capacitance can also be created by overlapping portions of the first and second conductive surfaces not formed into teeth. Preferably, there is little or no overlap between those portions of the first and second conductive surfaces not having teeth. As such, the capacitance can be varied from relatively low to relatively high values, since the amount of parasitic capacitance is comparatively small when the teeth do not overlap. For example, it is preferable to minimize the overlap between portions of the first and second plates on the substrate having no teeth and portions of the ring also lacking teeth. In this case, capacitance is substantially determined and varied according to the overlap of the teeth disposed on the first and second conductive surfaces. This concept may be implemented in many ways.

For example, the ring can be provided with a smaller diameter than the circle defined by the first and second plates. Teeth can be disposed facing outwardly from the ring. As such, teeth on the ring and plates selectively overlap as the ring rotates, while other parts of the first and second plates do not overlap the ring. For instance, the C-shaped first and second plates can be modified such that the conductive portion interconnecting the teeth has a substantially smaller surface area than the teeth. Thus, teeth on the ring can be disposed so as to overlap teeth on the first and second plates, while overlap between non-teeth portions of the first and second electrically conductive surfaces is minimized or eliminated. In some situations, overlap between non-teeth portions of the first and second conductive surfaces may be advantageous. In this case, at least part of the first and second conductive surfaces can be disposed so as to overlap regardless of rotation of the ring, such that a minimum amount of capacitance is always provided by the variable capacitor. In light of all the above, those skilled in the art will appreciate that the placement of the ring, first plate, second plate, and corresponding teeth can be varied as needed to provide a capacitance that varies as the ring rotates.

Further, the second electrically conductive surface on ring 200 can serve as part of more than one variable capacitor. As shown in FIG. 10(b), the ring serves as one plate of both variable capacitor C1 and variable capacitor C2. As such, variable capacitors C1 and C2 are effectively connected in series through the second electrically conductive surface of the ring.

The area of overlap between the first and second conducting surfaces can be controllably varied to alter the capacitance therebetween as the ring rotates. Preferably, the electrically conductive surfaces are constructed from metallized layers, although layers formed of semiconductor materials may also be used. Although not shown, the MEMS rotary structure of this embodiment can include electrical leads or paths to the first and second conducting surfaces in order to measure the capacitance therebetween. Again, those skilled in the art will recognize that the MEMS rotary structure can provide many other embodiments of the rotating variable capacitor design without departing from the spirit of the present invention.

Rotational Connection Elements for Hub and Ring Structures

There are two main techniques through which a hub 100 and optionally a ring may be affixed to a microelectronic substrate 10. First, in some embodiments the hub may be rigidly affixed to the microelectronic substrate. In this case, the hub may be directly affixed to the substrate, or indirectly affixed thereto through an anchor or the like. In addition, the hub may be rotatably connected to the underlying microelectronic substrate, such that relatively free rotation is possible.

Figure 11B:
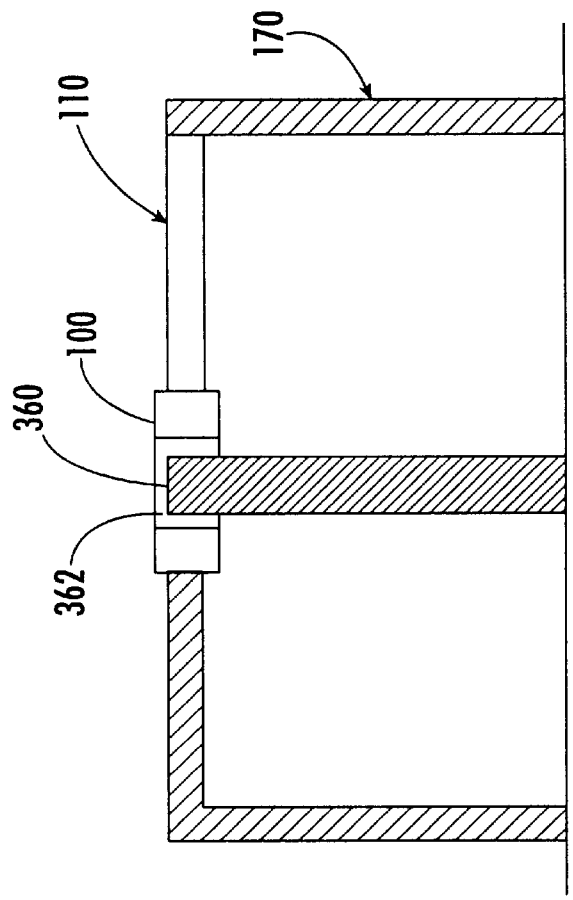
FIG. 11(a) and FIG. 11(b) are respectively a top view and a schematic side view illustrating a rotational connection between a pin disposed upon a base microelectronic substrate and a hub of any MEMS rotary structure of the present invention.
Figure 11A:
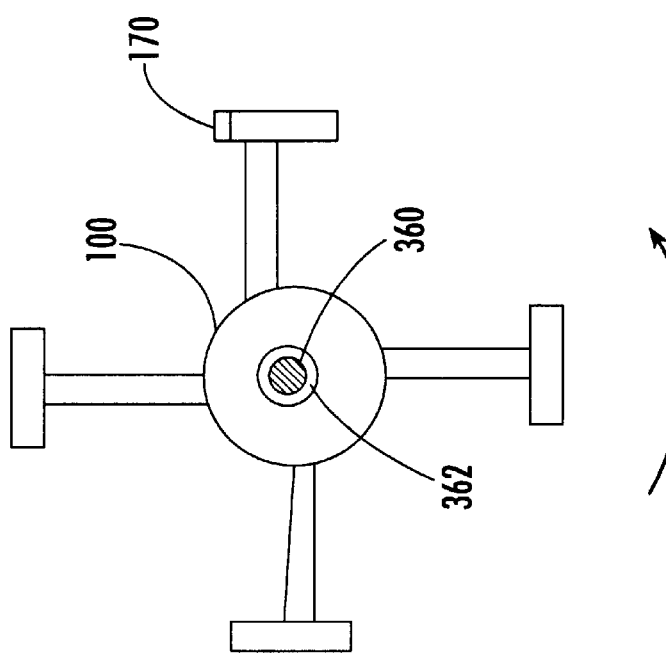

In one embodiment, the hub may be affixed to the microelectronic substrate through a rotational connection element. For instance, a rotational contact such as a rounded bearing, a ball and socket bearing, or some other rolling contact may be used, such as those described by U.S. patent application Ser. No. 08/719,711, the contents of which have been incorporated herein. The hub and ring could freely rotate relative to the microelectronic substrate through the rotational connection element. Preferably, a rotational connection to the microelectronic substrate could be provided through a pin joint mechanism, as shown in FIGS. 11(a) and (b). Although a hub is shown in this example, the pin joint is equally applicable for ring embodiments. A pin 360 is affixed to the base microelectronic substrate 10. An appropriate gap 362 is provided in hub 100 for example, such that the pin may be received therein. As such, the hub or hub and ring are preferably supported by anchors as shown, or the like. However, the hub or hub and ring can pivot or rotate about the pin in response to any of the sources of thermal actuation as previously discussed. The gap can be relatively large or small as required in order to permit rotation.

Regardless of the type of rotational connection element used, the hub is free to rotate because there are relatively low frictional forces or torsional stresses to overcome when a rotational connection is used. Relatively constant amounts of rotational force will therefore cause the hub to continue to rotate once the hub has begun to rotate. Once the hub with a rotational contact has been rotated into a given position, the hub remains in place even after the rotational force has been removed. Of course those skilled in the art will recognize that many other types of rotational connections may be used without departing from the scope and spirit of the present invention.

As described above, the various embodiments of the MEMS rotary structures can therefore be utilized in a wide variety of applications, such as rotary switches, actuators, variable capacitors, variable resistors, shutters, valves or the like. Those skilled in the art will understand that other applications not mentioned herein may exist. As such, the MEMS rotary structures of the present invention can be employed in various applications that demand or prefer non-linear movement in which conventional linear MEMS actuators would be inappropriate.

In the drawings and specification, there have been disclosed typical preferred embodiments of the present invention and, although specific terms are employed, they are used only in a generic and descriptive sense only and not for purposes of limiting the scope of the present invention as set forth in the following claims.

That which is claimed:

1. A microelectromechanical rotary structure comprising:
   a microelectronic substrate;
   a hub disposed upon a surface of said microelectronic substrate, said hub defining a central axis extending therethrough; and
   at least two hub spoke members extending outwardly from said hub, wherein each of the at least two hub spokes has an imaginary center line extending through at least a portion of said hub spoke member that is displaced from the central axis of said hub, and wherein said at least two hub spoke members are operably adapted to impose a rotational force upon said hub in response to changes in temperature that provide for thermophysical motion of said at least two hub spoke members.

2. A microelectromechanical rotary structure according to claim 1, further comprising a ring spaced apart from said microelectronic substrate and at least partially encircling said hub, wherein said at least two hub spoke members extend between said ring and said hub, and wherein said at least two hub spoke members are adapted to respond to changes in temperature by changing in length so as to rotate said ring relative to said hub.

3. A microelectromechanical rotary structure according to claim 2, wherein said at least two hub spoke members comprise first and second hub spoke members, wherein said hub comprises a first portion operably connected to said first hub spoke member and a second portion operably connected to said second hub spoke member, wherein said first portion and said second portion are electrically isolated such that an electrical voltage differential introduced therebetween creates an electrical current flowing from said first portion, through both said first and second hub spoke members and through said ring, to said second portion, thereby changing the temperature of both said first and second hub spoke members.

4. A microelectromechanical rotary structure according to claim 2, further comprising:
   at least two anchor members disposed on a surface of said microelectronic substrate and connected thereto; and at least two anchored spoke members disposed between a respective anchor member and said ring, wherein said at least two anchored spoke members are adapted to respond changes in temperature by changing in length so as to rotate said ring relative to said hub.

5. A microelectromechanical rotary structure according to claim 2, further comprising at least one lever member extending from said ring.

6. A microelectromechanical rotary structure according to claim 2, further comprising at least one microelectromechanical actuator disposed on the surface of said microelectronic substrate and operably connected to said ring so as to controllably move said ring in response to thermal actuation, said at least one microelectromechanical actuator comprising:

at least one ring spoke member extending outwardly from said ring;

at least two anchor members disposed on the surface of said microelectronic substrate and connected thereto; and at least one arched beam extending between said at least two anchor members, wherein said at least one arched beam is operably connected to said ring through said at least one ring spoke member, and wherein said at least one arched beam is adapted to further arch in response to thermal actuation so as to move said respective spoke member, thereby causing said ring to rotate relative to said hub.

7. A microelectromechanical rotary structure according to claim 6, wherein said at least one microelectromechanical actuator comprises:

a first set of microelectromechanical actuators having arched beams that are arched in a direction such that further arching of said arched beams causes said ring to rotate in a clockwise direction relative to said hub; and a second set of microelectromechanical actuators having arched beams that are arched in a direction such that further arching of said arched beams causes said ring to rotate in a counterclockwise direction relative to said hub.

8. A microelectromechanical rotary structure according to claim 6, further comprising a plurality of arched beams, and wherein said at least one microelectromechanical actuator further comprises a coupler for interconnecting said plurality of arched beams.

9. A microelectromechanical rotary structure according to claim 1, further comprising a heater for providing thermal energy to said at least two hub spoke members.

10. A microelectromechanical rotary structure according to claim 1, wherein said at least two hub spoke members are spaced about said hub at an angular displacement selected from the group consisting of equal angular displacements and unequal angular displacements.

11. A microelectromechanical rotary structure according to claim 1, further comprising at least one lever member extending from said hub.

12. A microelectromechanical rotary structure according to claim 1, further comprising at least one microelectromechanical actuator disposed on the surface of said microelectronic substrate and operably connected to a respective hub spoke member so as to controllably move said hub spoke member in response to thermal actuation, said at least one microelectromechanical actuator comprising:

at least two anchor members disposed on the surface of said microelectronic substrate and connected thereto; and at least one arched beam extending between said at least two anchor members, wherein said at least one arched beam is operably connected to said respective hub spoke member, and wherein said at least one arched beam is adapted to further arch in response to thermal actuation so as to move said respective hub spoke member, thereby imposing a rotational force upon said hub.

13. A microelectromechanical rotary structure according to claim 12, wherein said at least one microelectromechanical actuator comprises:

a first set of microelectromechanical actuators having arched beams that are arched in a direction such that further arching of said arched beams imposes a rotational force in a clockwise direction upon said hub; and a second set of microelectromechanical actuators having arched beams that are arched in a direction such that further arching of said arched beams imposes a rotational force in a counterclockwise direction upon said hub.

14. A microelectromechanical rotary structure according to claim 12, further comprising a plurality of arched beams, and wherein said at least one microelectromechanical actuator further comprises a coupler for interconnecting said plurality of arched beams.

15. A microelectromechanical rotary structure comprising:

a microelectronic substrate;

a hub disposed upon a surface of said microelectronic substrate;

a ring disposed above the surface of said microelectronic substrate and at least partially encircling said hub; and at least one hub spoke member that connects said ring and said hub, wherein said at least one hub spoke member is operably adapted to impose a rotational force upon said hub and said ring by changing in length in response to changes in temperature.

16. A microelectromechanical rotary structure according to claim 15, wherein said hub defines a central axis extending therethrough, and wherein an imaginary center line extending through at least a portion of said at least one hub spoke member also extends through said hub at a location displaced from the central axis of said hub.

17. A microelectromechanical rotary structure according to claim 15, further comprising:

at least one anchor member disposed on a surface of said microelectronic substrate and connected thereto; and at least one anchored spoke member disposed between a respective anchor member and said ring, wherein said at least one anchored spoke member is adapted to respond changes in temperature by changing in length so as to rotate said ring relative to said hub.

18. A microelectromechanical rotary structure according to claim 15, further comprising a heater for providing thermal energy to said at least one hub spoke member.

19. A microelectromechanical rotary structure according to claim 15, further comprising a plurality of hub spoke members, said plurality of hub spoke members being spaced at an angular displacement selected from the group consisting of equal angular displacements and unequal angular displacements.

20. A microelectromechanical rotary structure according to claim 15, further comprising at least one lever member extending from said ring.

21. A microelectromechanical rotary structure according to claim 15, further comprising a rotational connection element between said hub and said microelectronic substrate to facilitate relative rotation therebetween.

22. A microelectromechanical rotary structure according to claim 15, wherein said ring comprises a reflective surface on at least a portion of the surface of said ring.

23. A microelectromechanical rotary structure according to claim 15, wherein said ring defines at least one hole having an axis intersecting the surface of said microelectronic substrate, and wherein said at least one hole defined by said ring can be disposed proximate a predetermined area of the surface of said microelectronic substrate as said ring rotates relative to said hub.

24. A microelectromechanical rotary structure according to claim 23, wherein the surface of said microelectronic substrate defines at least one hole therethrough, said at least one hole defined in said microelectronic substrate being positioned such that said at least one hole defined by said ring and said at least one hole defined by said microelectronic substrate can be selectively aligned to provide a passage through said ring and said microelectronic substrate as said ring rotates relative to said hub.

25. A microelectromechanical rotary structure according to claim 15, further comprising at least one contact affixed to the surface of said microelectronic substrate and at least one contact affixed to said ring so that the contacts can alternately interconnect and disconnect as said ring rotates relative to said hub.

26. A microelectromechanical rotary structure according to claim 15, further comprising at least one contact affixed to the surface of said microelectronic substrate and at least one contact affixed to said ring and adapted for rotation therewith such that the contacts are selectively electrically connected to provide different amounts of electrical resistance as said ring rotates relative to said hub.

27. A microelectromechanical rotary structure according to claim 15, further comprising:
   a first conductive surface disposed on the surface of said microelectronic substrate; and
   a complimentary second conductive surface disposed on said ring overlying said microelectronic substrate and spaced apart from the first conductive surface such that a portion of the complimentary second conductive surface overlies the first conductive surface on said microelectronic substrate, wherein the portion of the complimentary second conductive surface which overlies the first conductive surface varies as said ring rotates relative to said hub.

28. A microelectromechanical rotary structure comprising:
   a microelectronic substrate;
   a hub disposed on a surface of said microelectronic substrate;
   at least one hub spoke member extending outwardly from said hub and spaced from the surface of said microelectronic substrate; and
   at least one microelectromechanical actuator disposed on the surface of said microelectronic substrate and operably connected to a respective hub spoke member so as to controllably move said respective hub spoke member in response to thermal actuation, said at least one microelectromechanical actuator comprising:
   at least two anchor members disposed on the surface of said microelectronic substrate; and
   at least one arched beam extending between said at least two anchor members, wherein said at least one arched beam is operably connected to said respective hub spoke member, and wherein said at least one arched beam is adapted to further arch in response to thermal actuation so as to move said respective hub spoke member, thereby imposing a rotational force upon said hub.

29. A microelectromechanical rotary structure according to claim 28, further comprising a heater for providing thermal energy to said at least one microelectromechanical actuator.

30. A microelectromechanical rotary structure according to claim 28, further comprising a plurality of hub spoke members extending outwardly in different directions from said hub, and a plurality of microelectromechanical actuators operably connected to respective ones of said hub spoke members.

31. A microelectromechanical rotary structure according to claim 30, wherein said plurality of microelectromechanical actuators comprise:
   a first set of microelectromechanical actuators having arched beams that are arched in a direction such that further arching of said arched beams impose a rotational force in a clockwise direction upon said hub; and
   a second set of microelectromechanical actuators having arched beams that are arched in a direction such that further arching of said arched beams imposes a rotational force in a counterclockwise direction upon said hub.

32. A microelectromechanical rotary structure according to claim 28, further comprising a plurality of arched beams, and wherein said at least one microelectromechanical actuator further comprises a coupler for interconnecting said plurality of arched beams.

33. A microelectromechanical rotary structure according to claim 28, wherein said hub defines a central axis extending therethrough, and wherein an imaginary line extending through at least a portion of said at least one hub spoke member also extends through said hub at a location displaced from the central axis of said hub.

34. A microelectromechanical rotary structure according to claim 28, further comprising at least one lever member extending from said hub.

35. A microelectromechanical rotary structure according to claim 28, further comprising a rotational connection element between said hub and said microelectronic substrate to facilitate relative rotation therebetween.

* * * * *